(12) United States Patent
Schanz et al.

(10) Patent No.: US 8,985,416 B2
(45) Date of Patent: Mar. 24, 2015

(54) MOUNTING INTERFACE FOR A REMOVABLE MOTORCYCLE ACCESSORY

(71) Applicant: Harley-Davidson Motor Company Group, LLC, Milwaukee, WI (US)

(72) Inventors: John W. Schanz, Hubertus, WI (US); Troy Schneiker, West Allis, WI (US); Joshua J. Hedtke, Brookfield, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 157 days.

(21) Appl. No.: 13/738,356

(22) Filed: Jan. 10, 2013

(65) Prior Publication Data

US 2014/0191006 A1 Jul. 10, 2014

(51) Int. Cl.
*B62J 11/00* (2006.01)
*B62J 7/04* (2006.01)
*B62J 7/02* (2006.01)
*B62J 9/00* (2006.01)

(52) U.S. Cl.
CPC ............ *B62J 11/00* (2013.01); *Y10T 29/49817* (2015.01); *B62J 7/02* (2013.01); *B62J 9/005* (2013.01); *B62J 7/04* (2013.01); *B62J 9/001* (2013.01)
USPC .......................................................... 224/413

(58) Field of Classification Search
USPC .......................... 224/413, 419, 423, 429, 430
See application file for complete search history.

(56) References Cited

U.S. PATENT DOCUMENTS

| | | |
|---|---|---|
| 2,771,305 A | 11/1956 | Buegeleisen |
| 3,625,405 A * | 12/1971 | Kezar et al. .................. 224/413 |
| 3,850,353 A | 11/1974 | Foulds |
| 3,927,727 A | 12/1975 | Hanagan |
| 4,174,796 A * | 11/1979 | Nakamura .................... 224/444 |
| 4,230,245 A | 10/1980 | Pold et al. |
| 4,257,544 A | 3/1981 | Dierkes |
| 4,480,773 A | 11/1984 | Krauser |
| 4,993,731 A | 2/1991 | Fuller |
| 5,299,832 A | 4/1994 | Price, Sr. |
| 5,558,260 A | 9/1996 | Reichert |
| 5,664,715 A | 9/1997 | Gogan et al. |
| 5,667,232 A | 9/1997 | Gogan et al. |
| 5,762,249 A | 6/1998 | Hann |

(Continued)

FOREIGN PATENT DOCUMENTS

| | | |
|---|---|---|
| DE | 4435229 | 4/1996 |
| EP | 240611 | 10/1987 |

(Continued)

*Primary Examiner* — Brian D Nash
(74) *Attorney, Agent, or Firm* — Michael Best & Friedrich LLP (57) ABSTRACT

A support assembly for removably attaching an accessory to a fender of a motorcycle. The support assembly includes left and right mounting brackets configured to be coupled to the fender. Each of the mounting brackets includes a receiving slot to provide access to respective mounting locations of the left and right mounting brackets for securing the accessory. Each receiving slot has a width. Left and right inserts are insertable into the respective receiving slots when the accessory is removed. Each of the left and right inserts includes an insertion portion and a shoulder portion. Each insertion portion has a first thickness less than the receiving slot width and is configured to be received by the corresponding receiving slot and to be coupled to the corresponding mounting bracket. The shoulder portion has a second thickness greater than the first thickness.

20 Claims, 7 Drawing Sheets

(56) References Cited

U.S. PATENT DOCUMENTS

| | | |
|---|---|---|
| 5,984,331 A | 11/1999 | Wright |
| 6,019,422 A | 2/2000 | Taormino et al. |
| 6,073,948 A | 6/2000 | Motojima et al. |
| 6,305,702 B1 | 10/2001 | Alford, II |
| 6,315,072 B1 * | 11/2001 | Brown et al. .................. 180/228 |
| 6,347,804 B1 | 2/2002 | Seibel |
| 6,349,783 B1 | 2/2002 | Galbraith et al. |
| 6,378,643 B1 | 4/2002 | Galbraith et al. |
| 6,443,344 B1 | 9/2002 | Nicosia et al. |
| 6,484,914 B1 | 11/2002 | Willey |
| 6,520,275 B2 | 2/2003 | Galbraith et al. |
| 7,021,708 B2 | 4/2006 | Renner |
| 7,036,837 B1 | 5/2006 | Bauer et al. |
| 7,174,875 B2 * | 2/2007 | Liang et al. ............... 123/195 R |
| 7,275,787 B1 | 10/2007 | Grove |
| 7,556,114 B2 | 7/2009 | Hanagan |
| 7,571,921 B1 | 8/2009 | Hoeve |
| 7,661,761 B1 | 2/2010 | Ortega |
| 7,793,747 B2 | 9/2010 | Brown |
| 7,931,176 B1 * | 4/2011 | Wenom, Jr. .................... 224/413 |
| 8,579,169 B2 * | 11/2013 | Racz et al. .................... 224/413 |
| 8,851,496 B2 * | 10/2014 | Hedtke ....................... 280/281.1 |
| 2003/0122002 A1 | 7/2003 | Monson |
| 2005/0150921 A1 | 7/2005 | Schneider |
| 2007/0056550 A1 * | 3/2007 | Liang et al. ............... 123/195 R |
| 2009/0001114 A1 | 1/2009 | Sonnetag et al. |
| 2010/0012415 A1 * | 1/2010 | Hedtke ......................... 180/219 |
| 2010/0012695 A1 * | 1/2010 | DeMilio ....................... 224/413 |
| 2010/0025443 A1 | 2/2010 | Racz et al. |
| 2010/0243691 A1 | 9/2010 | Salisbury |
| 2010/0307852 A1 | 12/2010 | Aramayo, II et al. |
| 2011/0139843 A1 * | 6/2011 | Thomas et al. ............... 224/413 |
| 2011/0315728 A1 | 12/2011 | Ghormley |
| 2013/0068812 A1 * | 3/2013 | St. Georges ................. 224/413 |
| 2014/0131128 A1 * | 5/2014 | Schuhmacher et al. ...... 180/219 |

FOREIGN PATENT DOCUMENTS

| | | |
|---|---|---|
| EP | 240612 | 10/1987 |
| GB | 2339414 | 1/2000 |

* cited by examiner

MOUNTING INTERFACE FOR A REMOVABLE MOTORCYCLE ACCESSORY

BACKGROUND

The present invention relates to motorcycles, and more specifically, to a mounting interface for a removable motorcycle accessory.

Removable accessories for motorcycles may leave the mounting surface exposed and susceptible to outdoor elements when removed. These accessories can also leave unsightly hardware behind, reducing the aesthetic appeal of the motorcycle.

SUMMARY

In one aspect, the invention provides a support assembly for removably attaching an accessory to a fender of a motorcycle. The support assembly includes left and right mounting brackets configured to be coupled to the fender. Each of the mounting brackets includes a receiving slot to provide access to respective mounting locations of the left and right mounting brackets for securing the accessory. Each receiving slot has a width. Left and right inserts are insertable into the respective receiving slots when the accessory is removed. Each of the left and right inserts includes an insertion portion and a shoulder portion. Each insertion portion has a first thickness less than the receiving slot width and is configured to be received by the corresponding receiving slot and to be coupled to the corresponding mounting bracket. The shoulder portion has a second thickness greater than the first thickness.

In another aspect the invention provides a support assembly for removably attaching an accessory to a fender of a motorcycle. The support assembly includes left and right mounting brackets configured to be coupled to the fender. Each of the mounting brackets has a receiving slot configured to receive a portion of the accessory. Left and right inserts are insertable into the receiving slots to a seated position when the accessory is removed. Each of the inserts includes a first portion concealed within the mounting bracket when the insert is in the seated position and a second portion adjacent to and substantially filling the receiving slot when the insert is in the seated position. Each receiving slot opens upwardly from a top surface of the corresponding mounting bracket.

In yet another aspect the invention provides a method of de-accessorizing a fender of a motorcycle. Left and right mounting brackets are provided on opposing sides of the fender. Each mounting bracket includes a receiving slot, and a detachable accessory is supported by mounting portions of the detachable accessory through engagement with a respective mounting interface of each of the left and right mounting brackets. The mounting portions of the detachable accessory are decoupled from the mounting interfaces of the mounting brackets. The accessory is removed from the mounting brackets by extracting the mounting portions of the detachable accessory from the respective receiving slots. A pair of left and right inserts are provided and each insert has a first portion engageable with one of the mounting interfaces of the mounting brackets. The left and right inserts are inserted into the respective receiving slots. The first portion of each insert is secured to the mounting interface of the corresponding mounting bracket with at least one fastener. The receiving slots of the corresponding mounting brackets are substantially closed with second portions of the corresponding inserts when the first portions of the inserts are secured to the corresponding mounting interfaces.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
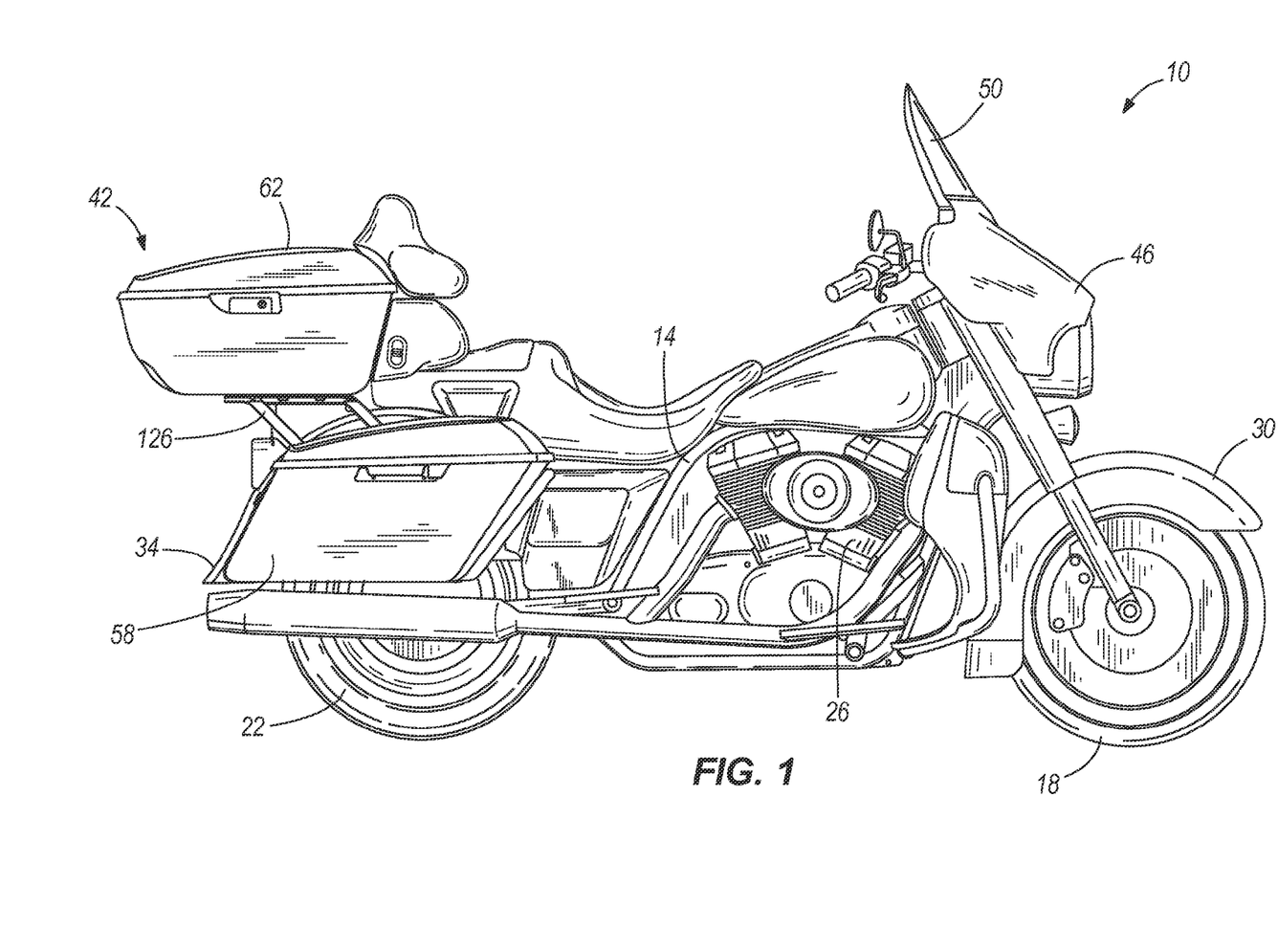
FIG. 1 is a side view of a motorcycle including a removable accessory and a mounting interface for the accessory according to one embodiment of the present invention.

FIG. 1 illustrates a motorcycle 10. The motorcycle 10 includes a frame 14, a front wheel 18, and at least one rear wheel 22. An engine 26 is configured to drive the at least one rear wheel 22. A front fender 30 and a rear fender 34 are provided as body panels. A support assembly 38 (FIG. 2) is provided for removably attaching an accessory 42 to the frame 14 of the motorcycle 10. The motorcycle 10 illustrated is a touring motorcycle, provided with a front cowling 46, a windshield 50, and integrated luggage containers, such as a pair of saddlebags 58, and the removable accessory 42, which includes a top case 62 (e.g., Harley-Davidson TOUR-PAK®).

Figure 2:
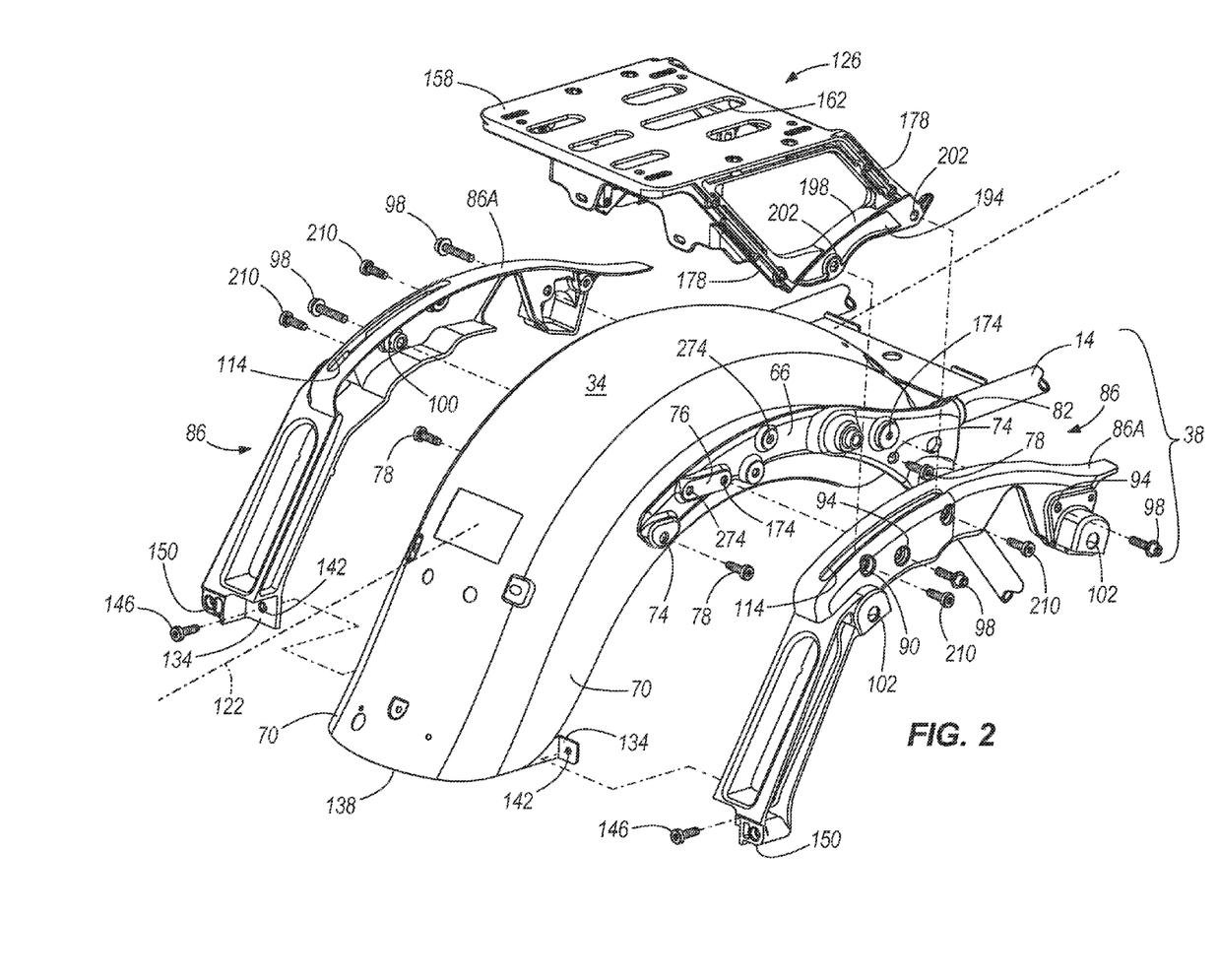
FIG. 2 is an exploded view of a rear portion of the motorcycle of FIG. 1, including a luggage mounting bracket and a support assembly mounted on a rear fender to selectively support the luggage mounting bracket.

Referring to FIG. 2, the support assembly 38 includes a pair of left and right fender struts, or inner mounting brackets 66 provided at a rearward extent of the frame 14 and coupled to the rear fender 34 at opposing, laterally outward sides 70 of the rear fender 34. The inner mounting brackets 66 each include a plurality of holes 74. Each of the inner mounting brackets 66 is fastened directly to the corresponding laterally outward side 70 of the rear fender 34 with threaded rear fender fasteners 78. For example, the holes 74 may be clearance holes for the fasteners 78, which are passed through the holes 74 to engage a threaded portion of the rear fender 34, or a nut on the interior of the rear fender 34. The rear fender 34 and the inner mounting brackets 66 can also be coupled in other ways, as will be apparent to one of ordinary skill in the art. The inner mounting brackets 66 are secured to or integral with a rear section 82 of the motorcycle frame 14. The support assembly 38 further includes a pair of left and right outer mounting brackets 86 that are coupled to the rear fender 34 of the motorcycle via the inner mounting brackets 66 and substantially conceal the inner mounting brackets 66 when coupled.

Each outer mounting bracket 86 includes two positioning holes 94. Threaded saddlebag support fasteners 98 are inserted through each of the positioning holes 94 (e.g., clearance holes) to couple the outer mounting brackets 86 to the inner mounting brackets 66 via threaded apertures 174 provided in the inner mounting brackets 66. A boss 100 protrudes laterally inward from the inside of each of the outer mounting brackets 86, as seen at the left hand side of FIG. 2. The boss 100 abuts with an elongated boss 76 on the corresponding inner mounting bracket 66, seen at the right hand side of FIG. 2, to provide contact control for positioning the outer mounting bracket 86 relative to the inner mounting brackets 66 and the frame 14 when the fasteners 98 are secured. The outer mounting brackets 86 are saddlebag mounting brackets in the illustrated construction, each provided with at least one mounting location or interface 102 for securing a corresponding saddlebag 58 (FIG. 2). The rear fender 34 includes brackets 134 that extend laterally outward from a rear, bottom portion 138 of the rear fender 34. Each bracket 134 includes a hole 142 through which a threaded saddlebag support fastener 146 is inserted to couple a bottom portion 150 of the outer mounting bracket 86 to the respective bracket 134.

With continued reference to FIG. 2, the outer mounting brackets 86 define a substantially curved shape, similar to that of the rear fender 34. A portion of each of the outer mounting brackets 86, e.g. a top surface 86A, defines a receiving slot 114, that opens upward when coupled to the motorcycle 10 (FIG. 1). The receiving slots 114 each have a first width 118 that is measured laterally, perpendicular to a longitudinal centerline 122 of the motorcycle 10. Each of the receiving slots 114 provides access for a luggage mounting bracket 126 for mounting a portion of the accessory 42. A mounting interface is accessible through each of the receiving slots 114. In the illustrated construction, the mounting interface is provided by the inner mounting brackets 66 and threaded apertures 274 therein.

Figure 3:
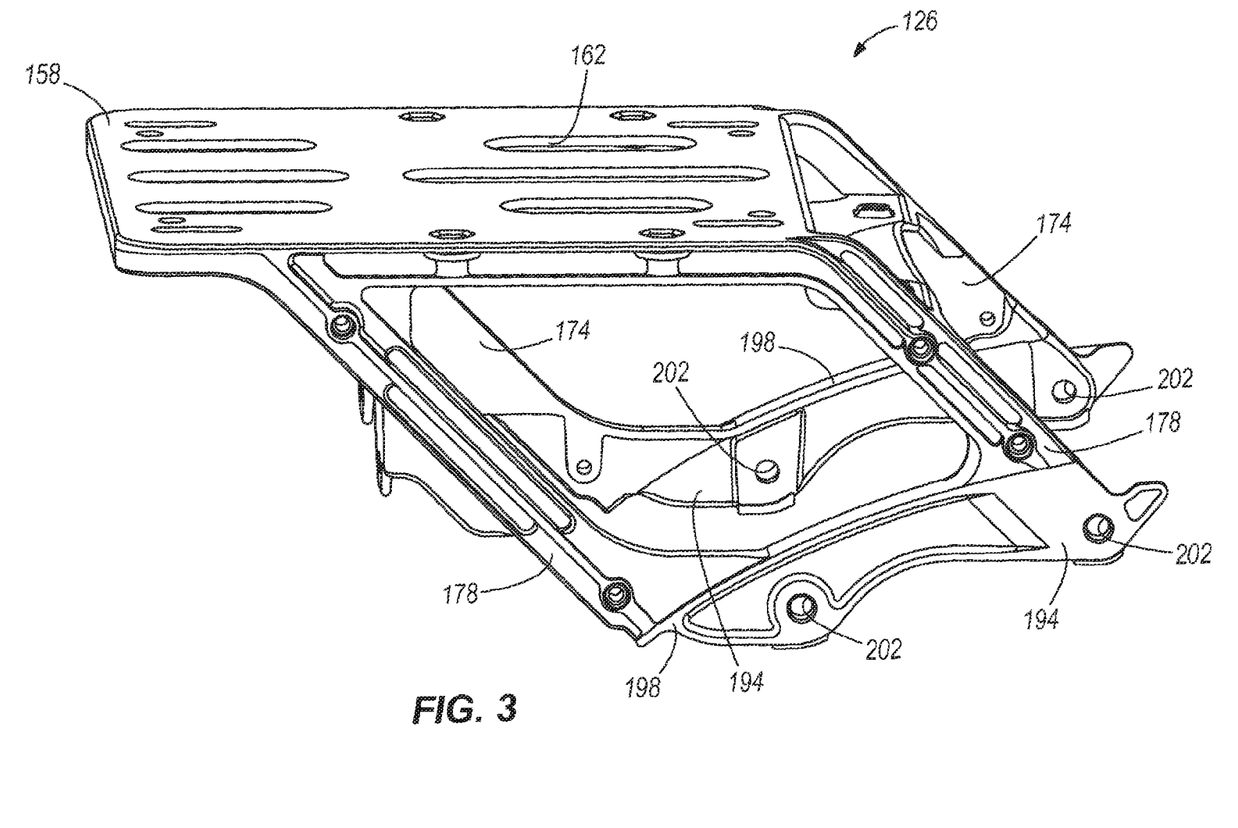
FIG. 3 is a perspective view of the luggage mounting bracket of FIG. 2.

As shown in FIG. 2, the luggage mounting bracket 126 is configured to support the luggage container 62 and mount to the support assembly 38. More specifically, the luggage mounting bracket 126 includes two insertion portions 194 that extend into the receiving slots 114 and are coupled to the respective inner mounting bracket 66 via the threaded apertures 274. The luggage mounting bracket 126 includes a plate portion 158. The plate portion 158 includes a plurality of holes 162 for mounting the luggage container 62, as shown in FIG. 1. Together, the luggage mounting bracket 126 and the luggage container 62 form the removable accessory 42. Other types of removable accessories, such as a backrest or a luggage rack, can be coupled to the support assembly 38 via interface 102. Referring to FIG. 3, two left supporting arms 174 and two right supporting arms 178 extend downwardly from the plate portion 158.

Each of the left and right mounting portions of the luggage mounting bracket 126 includes an insertion portion 194 and a shoulder portion 198 extending between the two corresponding supporting arms 174, 178. Each insertion portion 194 has a first thickness and is configured to extend into the receiving slot 114 on the corresponding outer mounting bracket 86 (FIG. 2). Two mounting holes 202 extend through each insertion portion 194. The mounting holes 202 are clearance holes that receive the fasteners 210 to secure the luggage mounting bracket 126 on the support assembly 38.

Figure 4:
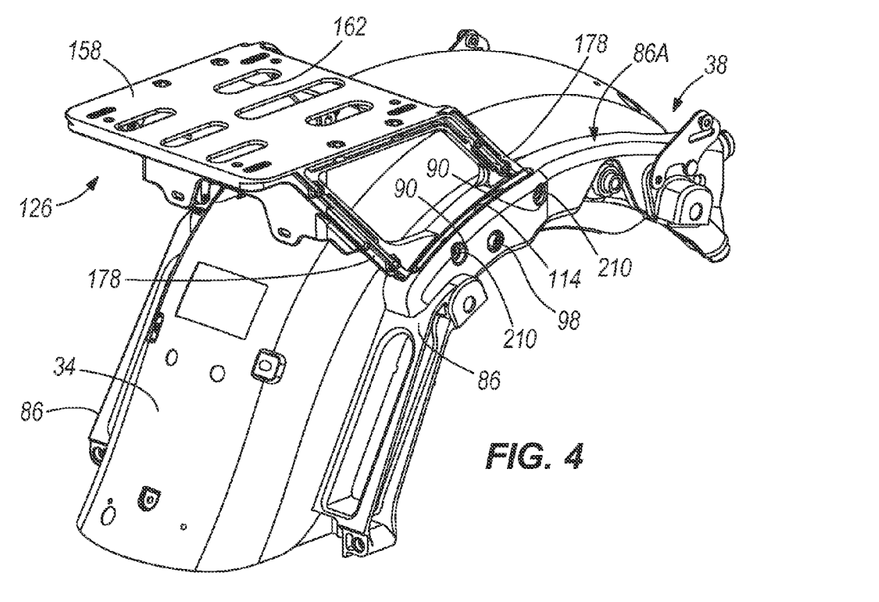
FIG. 4 is a perspective view of the luggage mounting bracket of FIG. 3 inserted into saddlebag mounting brackets of the support assembly.
Figure 5:
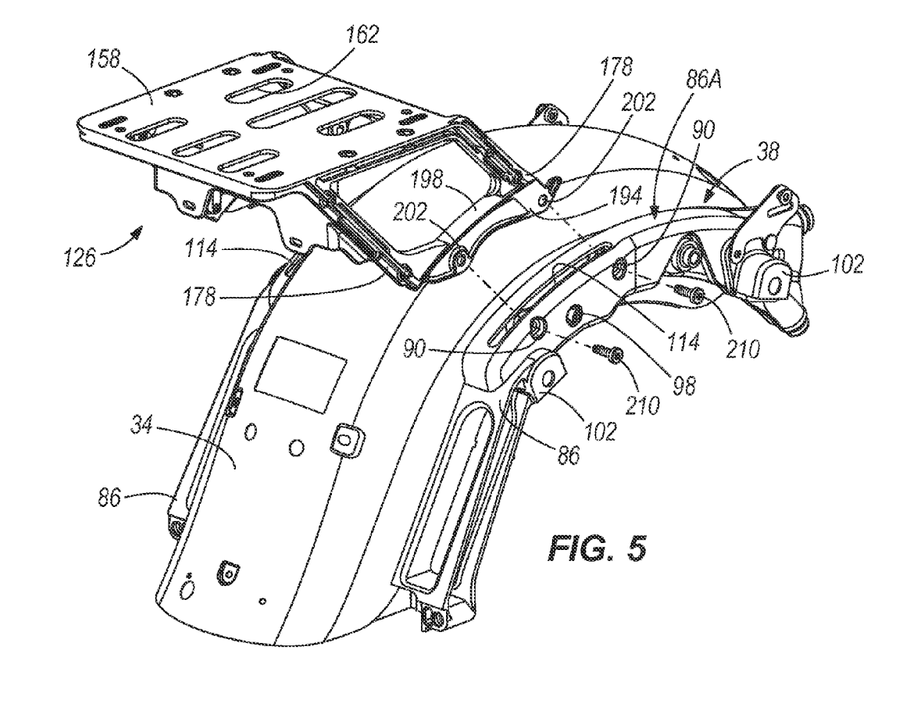
FIG. 5 is a perspective view of the luggage mounting bracket of FIG. 3 removed from the saddlebag mounting brackets.

Referring to FIGS. 4 and 5, the insertion portions 194 are configured to be removably inserted into the receiving slots 114 to couple the luggage mounting bracket 126 with the inner and the outer mounting brackets 66, 86. Two clearance holes 90 are provided in each outer mounting bracket 86. The clearance holes 90 receive the corresponding fasteners 210 (e.g. threaded fasteners such as screws or bolts). Each fastener 210 passes through the clearance hole 90, through the corresponding hole 202 in the insertion portion 194, and engages one of the threaded apertures 274 in the inner support members 66 to retain or secure the luggage mounting bracket 126 relative to the support assembly 38. FIG. 5 illustrates the luggage mounting bracket 126 removed from the outer mounting brackets 86.

Figure 6:
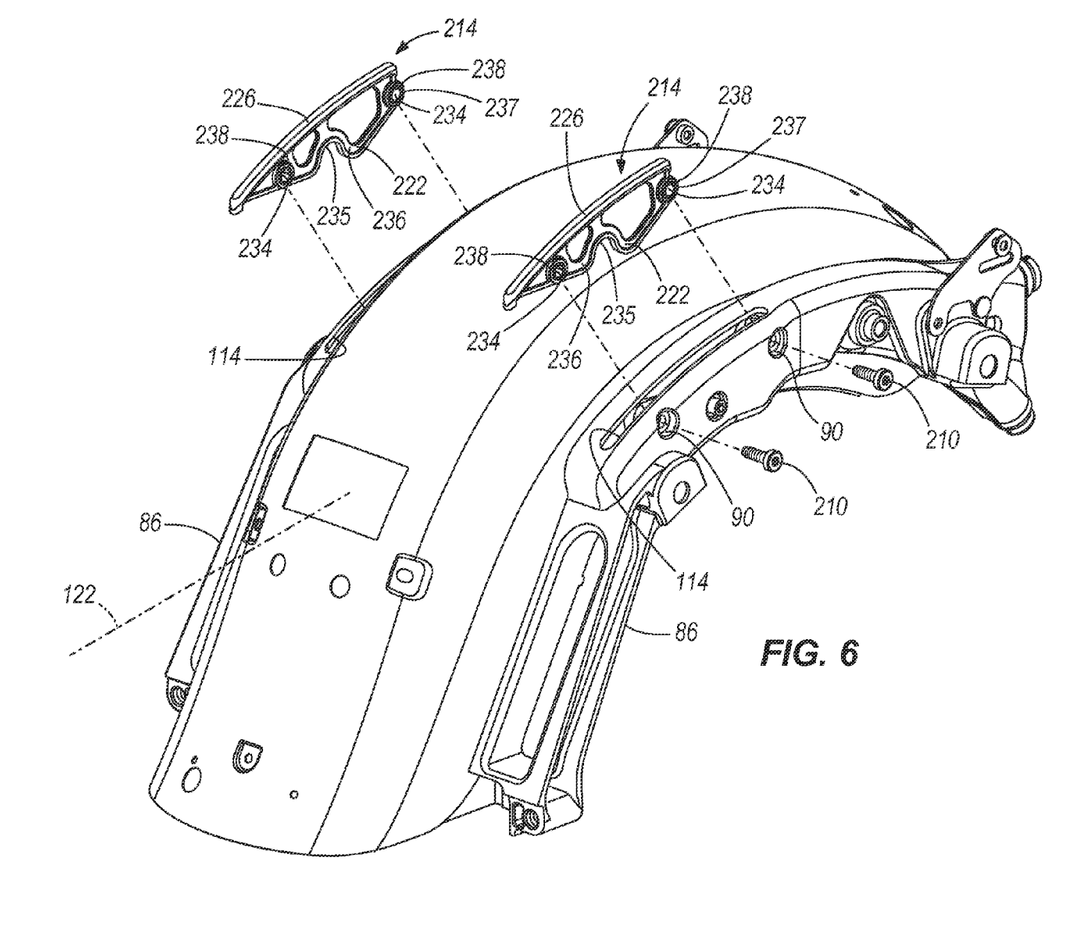
FIG. 6 is a perspective view illustrating the insertion of a left insert and a right insert into the saddlebag mounting brackets.
Figure 8:
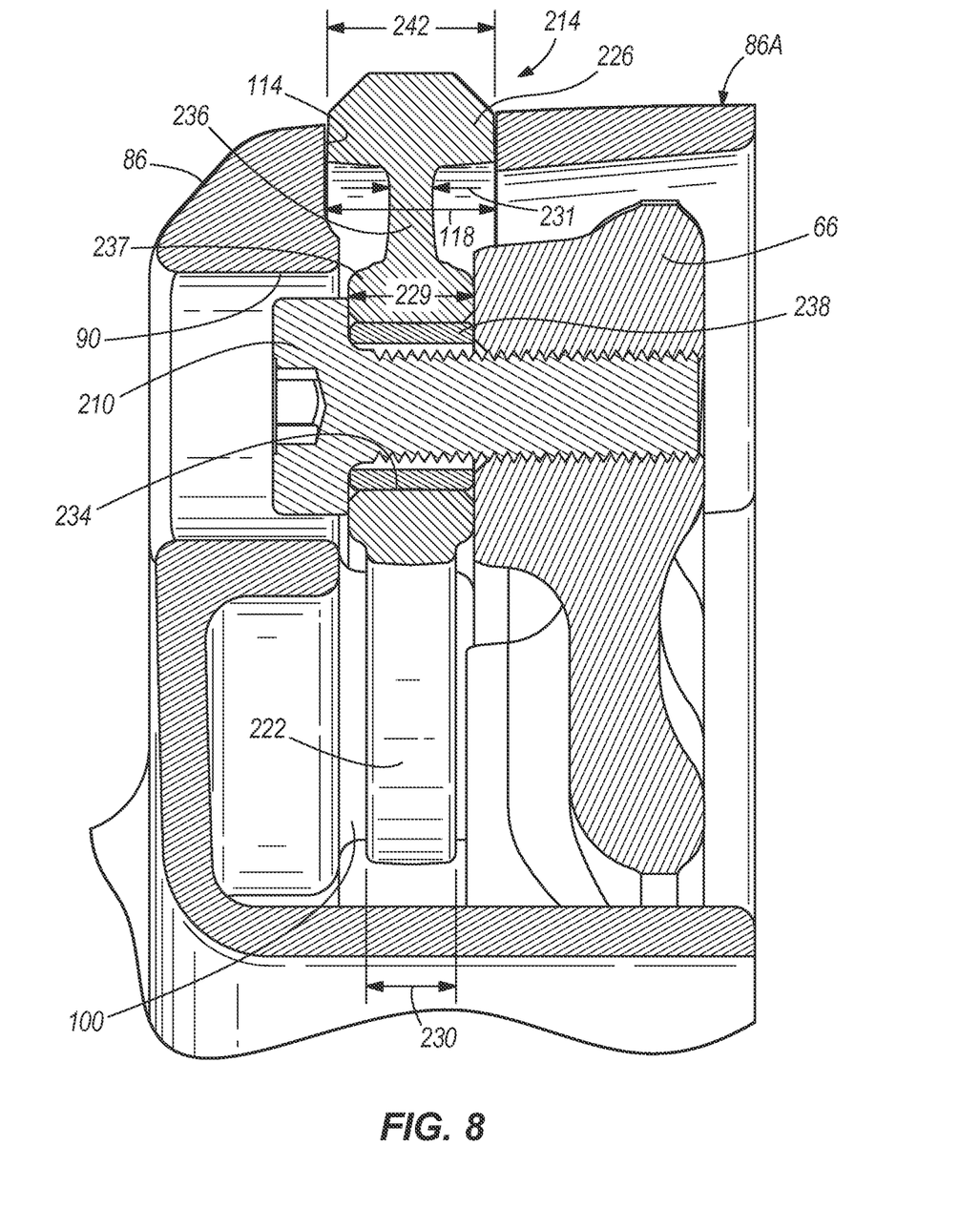
FIG. 8 is a cross-section view of the right insert, taken along line 8-8 of FIG. 7.

As shown in FIG. 6, inserts 214 are configured to be inserted into the corresponding receiving slots 114 upon removal of the luggage mounting bracket 126 (FIG. 3). Each insert 214 includes an insertion portion 222 and a shoulder portion 226. Two mounting holes 234 extend through each of the insertion portions 222 and are configured to receive the fasteners 210 to couple the insert 214 to the mounting interface of the inner support members 66. The coupling of the insert 214 to the mounting interface of the inner support member 66 defines a seated position of the insert 214. The insertion portion 222 includes a body portion 236 and a boss portion 237 that surrounds each of the mounting holes 234. The insertion portion 222 defines different thicknesses at different portions measured laterally, perpendicular to the longitudinal centerline 122 of the motorcycle 10 as shown in FIG. 8. A thickness 229 of the boss portion 237 is the thickest portion of the insertion portion 222. A bottom edge portion of the insert 214 has a thickness 230 less than the thickness 229 of the boss portion 237. A body portion 236 has a thickness 231 less than the bottom edge thickness 230. The insertion portion 222 is configured to extend through the corresponding receiving slot 114 such that it is substantially concealed within the outer mounting bracket 86. A recess 235 is positioned between the mounting holes 234 on the insertion portion 222 and is configured to accept the boss 100 on the interior of the corresponding outer mounting bracket 86. The inserts 214 can be constructed of a chrome-plated plastic material, or various other non-metallic or metallic materials. A compression limiter 238 (e.g., of carbon steel) is press-fit into each of the mounting holes 234 to provide mounting surfaces of increased strength and hardness within the insertion portions 222.

Figure 7:
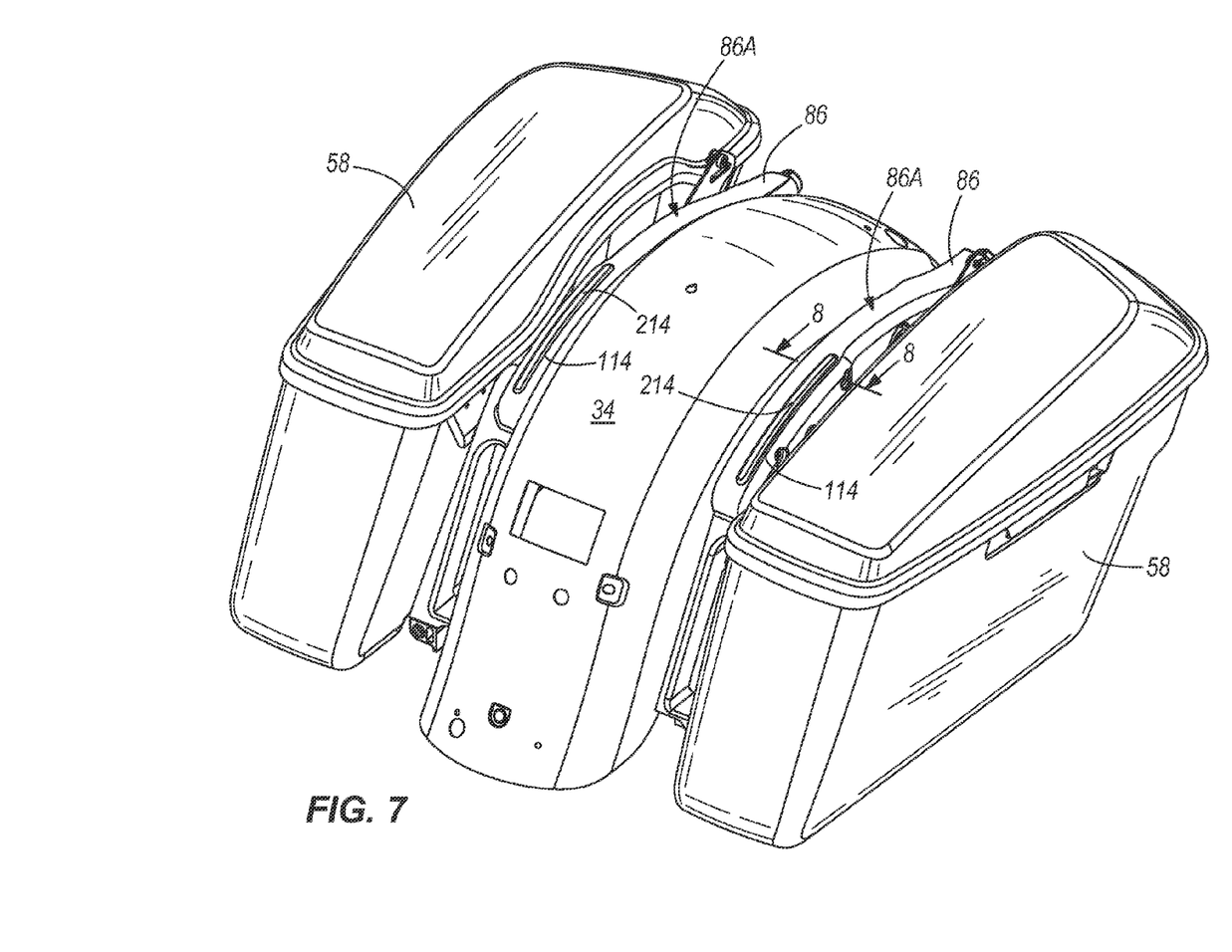
FIG. 7 is a perspective view of the left insert and the right insert of FIG. 6 inserted into the saddlebag mounting brackets, with left and right saddlebags coupled to the saddlebag mounting brackets.

The shoulder portion 226 is adjacent to and substantially fills the receiving slot 114 when the insert 214 is inserted into the outer mounting brackets 86 to the seated position as shown in FIG. 7. The shoulder portion 226 may be partially or fully received into the receiving slot 114. As shown in FIG. 8, the shoulder portion 226 has a thickness 242 as great as, or greater than, the thickness of any part of the insertion portion 222. The thickness 242 of the shoulder portion 226 is about equal to the width 118 of the receiving slot 114 to substantially close the receiving slot 114. This can prevent debris or dirt from entering the receiving slot 114 when the accessory 42 is not attached.

FIG. 7 illustrates an option for mounting additional accessories, and more specifically, left and right saddlebags 58 to the outer mounting brackets 86. Other various accessories may also be mounted to the outer mounting brackets 86 as desired by a user.

A method of de-accessorizing the rear fender 34 of the motorcycle 10 shown in FIG. 1 is as follows. Left and right outer mounting brackets 86 are provided on opposing sides 70 of the rear fender 34 as illustrated in FIG. 2. The luggage mounting bracket 126 of the removable accessory 42 is mounted into the outer mounting brackets 86 as shown in FIG. 4. The removable accessory 42 can be decoupled and removed from the outer mounting brackets 86 as desired by a user, leaving the receiving slots 114 on the outer mounting brackets 86 exposed as shown in FIG. 5. The left and right inserts 214 are placed into the receiving slots 114 such that the shoulder portions 226 substantially fill and/or conceal the receiving slots 114 (FIGS. 6 and 7). The insertion portion 222 of each insert 214 is secured to the inner mounting bracket 66 with at least one of the fasteners 210. Thus, the inserts 214 can be secured to the accessory mounting interface with the same fasteners 210 used to secure the accessory 42 such that no additional mounting interface or hardware is required to couple the inserts 214 to the motorcycle 10.

Various features and advantages of the invention are set forth in the following claims.

What is claimed is:

1. A support assembly for removably attaching an accessory to a fender of a motorcycle, the support assembly comprising:
    left and right mounting brackets configured to be coupled to the fender, each of the mounting brackets having a receiving slot, the receiving slot providing access to respective mounting locations of the left and right mounting brackets for securing the accessory, each receiving slot having a width; and
    left and right inserts insertable into the respective receiving slots when the accessory is removed, each of the left and right inserts including
        an insertion portion having a first thickness and provided with at least one mounting hole, the insertion portion configured to be received by the corresponding receiving slot and to be coupled to the corresponding mounting bracket, wherein the first thickness is less than the receiving slot width, and
        a shoulder portion having a second thickness greater than the first thickness.

2. The support assembly of claim 1, wherein the second thickness is about equal to the receiving slot width.

3. The support assembly of claim 1, wherein the left and right mounting brackets are outer mounting brackets, the support assembly further comprising left and right inner mounting brackets.

4. The support assembly of claim 3, wherein each one of the outer mounting brackets includes at least one clearance hole adjacent to the respective receiving slot.

5. The support assembly of claim 4, further comprising at least one left fastener and at least one right fastener, wherein each of the left and right fasteners extends through the clearance hole in the respective outer mounting bracket and through the mounting hole in the respective insertion portion and engages the respective inner mounting bracket.

6. The support assembly of claim 1, wherein a steel compression limiter is press-fit into the at least one mounting hole of each of the left and right inserts.

7. The support assembly of claim 1, wherein the shoulder portion of each insert extends above a top surface of the corresponding mounting bracket when the insertion portion is coupled to the mounting bracket.

8. The support assembly of claim 1, wherein the left and right inserts are formed of a chrome-plated plastic material.

9. The support assembly of claim 1, wherein each of the left and right mounting brackets has corresponding mounting interfaces for both a saddlebag and the accessory, which is a detachable top case.

10. The support assembly of claim 1, wherein left and right mounting brackets are left and right saddlebag mounting brackets.

11. A support assembly for removably attaching an accessory to a fender of a motorcycle, the support assembly comprising:
    left and right mounting brackets configured to be coupled to the fender, each of the mounting brackets having a receiving slot configured to receive a portion of the accessory; and
    left and right inserts insertable into the receiving slots to a seated position when the accessory is removed, each of the inserts including
        a first portion having at least one mounting hole, the first portion concealed within the mounting bracket when the insert is in the seated position, and
        a second portion adjacent to and substantially filling the receiving slot when the insert is in the seated position.

12. The support assembly of claim 11, wherein the left and right mounting brackets are outer mounting brackets, the support assembly further comprising left and right inner mounting brackets.

13. The support assembly of claim 12, wherein each one of the outer mounting brackets includes at least one clearance hole adjacent to the respective receiving slot.

14. The support assembly of claim 13, further comprising at least one left fastener and at least one right fastener, wherein each of the left and right fasteners extends through the clearance hole in the respective outer mounting bracket and through the mounting hole in the respective insertion portion and engages the respective inner mounting bracket.

15. The support assembly of claim 11, wherein a steel compression limiter is press-fit into the at least one mounting hole of each of the left and right inserts.

16. The support assembly of claim 11, wherein the second portion extends above the top surface of the outer mounting bracket when the insertion portion is coupled to the respective mounting bracket.

17. The support assembly of claim 11, wherein the left and right inserts are formed of a chrome-plated plastic material.

18. The support assembly of claim 11, wherein each of the left and right mounting brackets has corresponding mounting interfaces for both a saddlebag and the accessory, which is a detachable top case.

19. The support assembly of claim 11, wherein the left and right mounting brackets are left and right saddlebag mounting brackets.

20. A support assembly for removably attaching an accessory to a fender of a motorcycle, the support assembly comprising:
    left and right mounting brackets configured to be coupled to the fender, each of the mounting brackets having a receiving slot configured to receive a portion of the accessory;
    left and right inserts insertable into the receiving slots to a seated position when the accessory is removed, each of the inserts including
        a first portion concealed within the mounting bracket when the insert is in the seated position, and
        a second portion adjacent to and substantially filling the receiving slot when the insert is in the seated position;
    at least one left fastener extending at least partially through a clearance hole of the left mounting bracket and a mounting hole of the left insert to secure the left insert within the receiving slot of the left mounting bracket; and at least one right fastener extending at least partially through a clearance hole of the right mounting bracket and a mounting hole of the right insert to secure the right insert within the receiving slot of the right mounting bracket.

* * * * *